United States Patent [19]
Woytaszek

[11] Patent Number: 5,976,047
[45] Date of Patent: Nov. 2, 1999

[54] GEAR SYSTEM WITH ELECTRIC MOTOR DRIVING PLANET GEAR ABOUT FIXED SUN GEAR TO IMPART ROTATION TO CARRIER

[76] Inventor: Lloyd Woytaszek, 9549 Fitzpatrick, Alpena, Mich. 49707

[21] Appl. No.: 08/991,680

[22] Filed: Dec. 16, 1997

[51] Int. Cl.$^6$ ............................. F16H 1/32; H02K 7/116
[52] U.S. Cl. ............................. 475/149; 475/5; 475/311; 310/112; 310/83
[58] Field of Search .................... 475/149, 151, 475/311, 1, 5, 6; 74/665 A, 665 B; 310/112, 114, 83

[56] References Cited

U.S. PATENT DOCUMENTS

| | | |
|---|---|---|
| 328,014 | 10/1885 | Cushman . |
| 938,918 | 11/1909 | Tuch ........................................ 310/112 |
| 1,366,325 | 1/1921 | Perin . |
| 1,495,930 | 5/1924 | Sing ............................................. 475/5 |
| 1,610,666 | 12/1926 | Farrell ................................. 475/149 X |
| 1,815,334 | 7/1931 | Sheridan . |
| 2,033,343 | 3/1936 | Larkin, Jr. . |
| 2,122,330 | 6/1938 | Stenzy . |
| 2,179,405 | 11/1939 | De Falco . |
| 2,795,971 | 6/1957 | Annis . |
| 2,989,596 | 6/1961 | Lee et al. . |
| 3,156,136 | 11/1964 | Sogabe . |
| 3,330,171 | 7/1967 | Nasvytis . |
| 3,543,690 | 12/1970 | Lee . |
| 3,562,567 | 2/1971 | Carini ....................................... 310/112 |
| 4,044,633 | 8/1977 | Lee . |
| 4,321,842 | 3/1982 | Stromotich . |
| 4,779,486 | 10/1988 | Schumacher ................................ 475/5 |
| 4,858,490 | 8/1989 | Grant ...................................... 475/1 X |

FOREIGN PATENT DOCUMENTS

| | | | |
|---|---|---|---|
| 138085 | 5/1930 | Switzerland ................................ 475/5 |

*Primary Examiner*—Charles A. Marmor
*Assistant Examiner*—Ankur Parekh
*Attorney, Agent, or Firm*—Reising, Ethington, Barnes, Kisselle, Learman & McCulloch, P.C.

[57] ABSTRACT

A gear-reducing, torque-multiplying gear drive assembly includes a stationary outer case housing an internal rotary carrier having an output shaft fixed thereto which is journaled by the case for rotation of the carrier and shaft relative to the case. A pair of electric motors are mounted on the carrier and drive a pair of associated planet gears which are enmeshed with a fixed sun gear. Operating the motors rotates the planet gears causing the carrier and the output stub shafts fixed thereto to rotate about a common axis of the stub shafts.

19 Claims, 2 Drawing Sheets

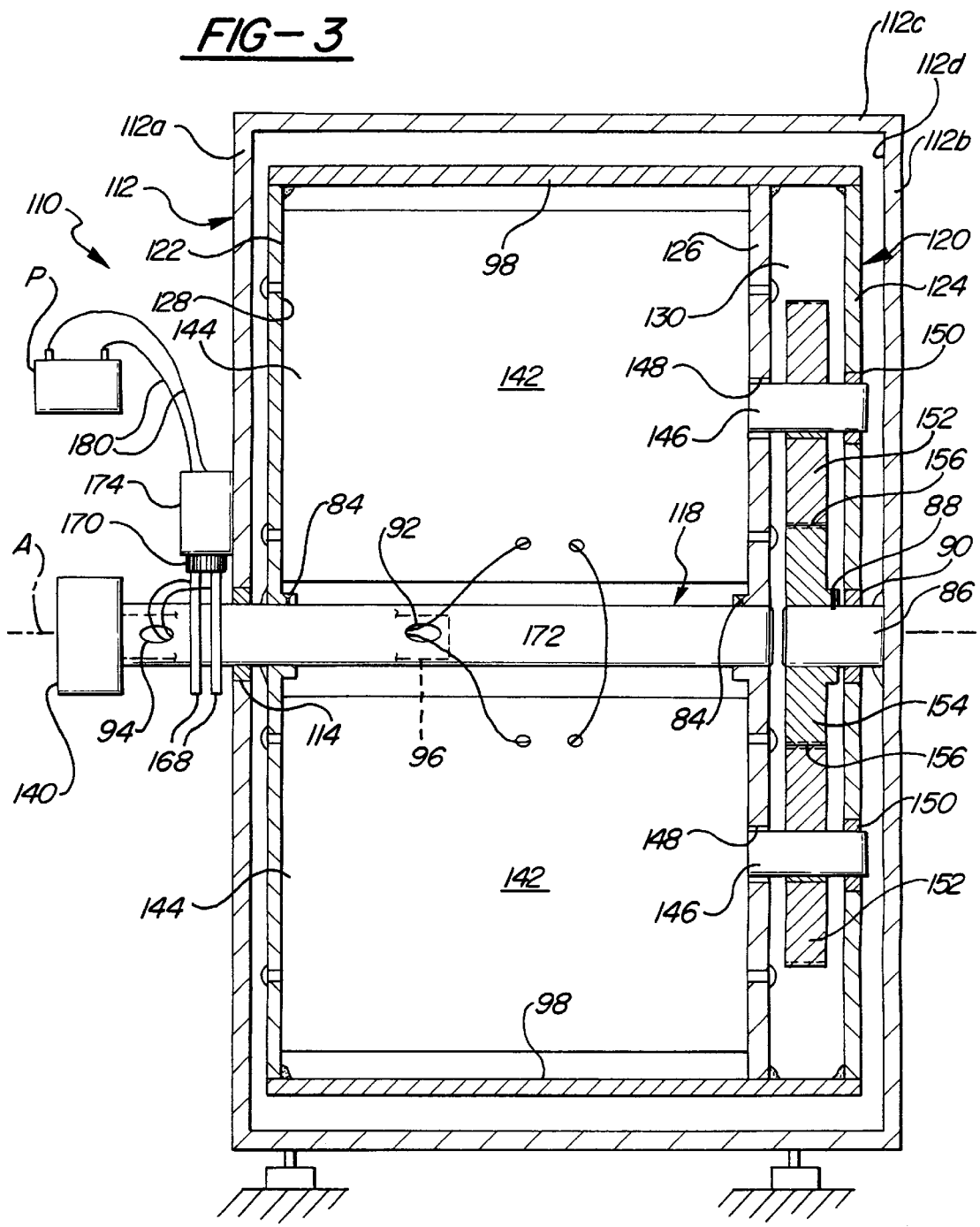

GEAR SYSTEM WITH ELECTRIC MOTOR DRIVING PLANET GEAR ABOUT FIXED SUN GEAR TO IMPART ROTATION TO CARRIER

This invention relates to rotary gear systems and particularly those that generate a reduced gear ratio with a corresponding increased torque ratio between the driving and driven members of the system.

BACKGROUND OF THE INVENTION

Various gearing arrangements have been proposed that increase the output torque of the driven component of a system in relation to the input torque by control of the input-to-output gear ratio.

U.S. Pat. Nos. 2,122,330; 3,156,136; and 4,321,842 disclose rotary drive gear systems in which an internal rotary carrier is arranged with a stationary case and carries a driven gear set that interacts with a stationary sun gear to rotate the carrier and an output shaft with increased torque. In one embodiment of the '842 patent, the carrier mounts an electric motor having a drive shaft on which two cog wheels are mounted that are coupled by endless belts to a pair of sun cogs, one of which is fixed to the external case and the other which is fixed to an output shaft journaling the carrier.

It is an object of the present invention to provide such an electric driven rotary gearing arrangement but of a much simpler design involving fewer parts and improved versatility.

SUMMARY OF THE INVENTION

A rotary gear drive assembly constructed according to the present invention comprises a stationary outer case journaling an output shaft. A rotary carrier is accommodated within the case and fixed to the output shaft for rotation with the shaft relative to the case. A stationary sun gear is fixed against rotation to the case. At least one electric motor is mounted on the carrier and includes a drive shaft supported in parallel, spaced relation to the output shaft on which a planet gear is mounted and drivingly coupled to the fixed sun gear. Operating the motor rotates the planet gear which in turn reacts with the fixed sun gear to rotate the carrier and output shaft.

By fixing the carrier directly to the output shaft, the invention eliminates an additional gear set of the prior art design and simplifies the overall structure. Moreover, such arrangement of the carrier and output shaft allows the shaft to be extended out of both ends of the case providing dual outputs to the assembly.

BRIEF DESCRIPTION OF THE DRAWINGS

These and other features and advantages of the present invention will become more fully appreciated by those skilled in the art when considered in connection with the following detail description and accompanying drawings, wherein:

FIG. 3 is a view like FIG. 1 but of another alternative embodiment of the invention.

DETAILED DESCRIPTION OF PREFERRED EMBODIMENTS

Figure 1:
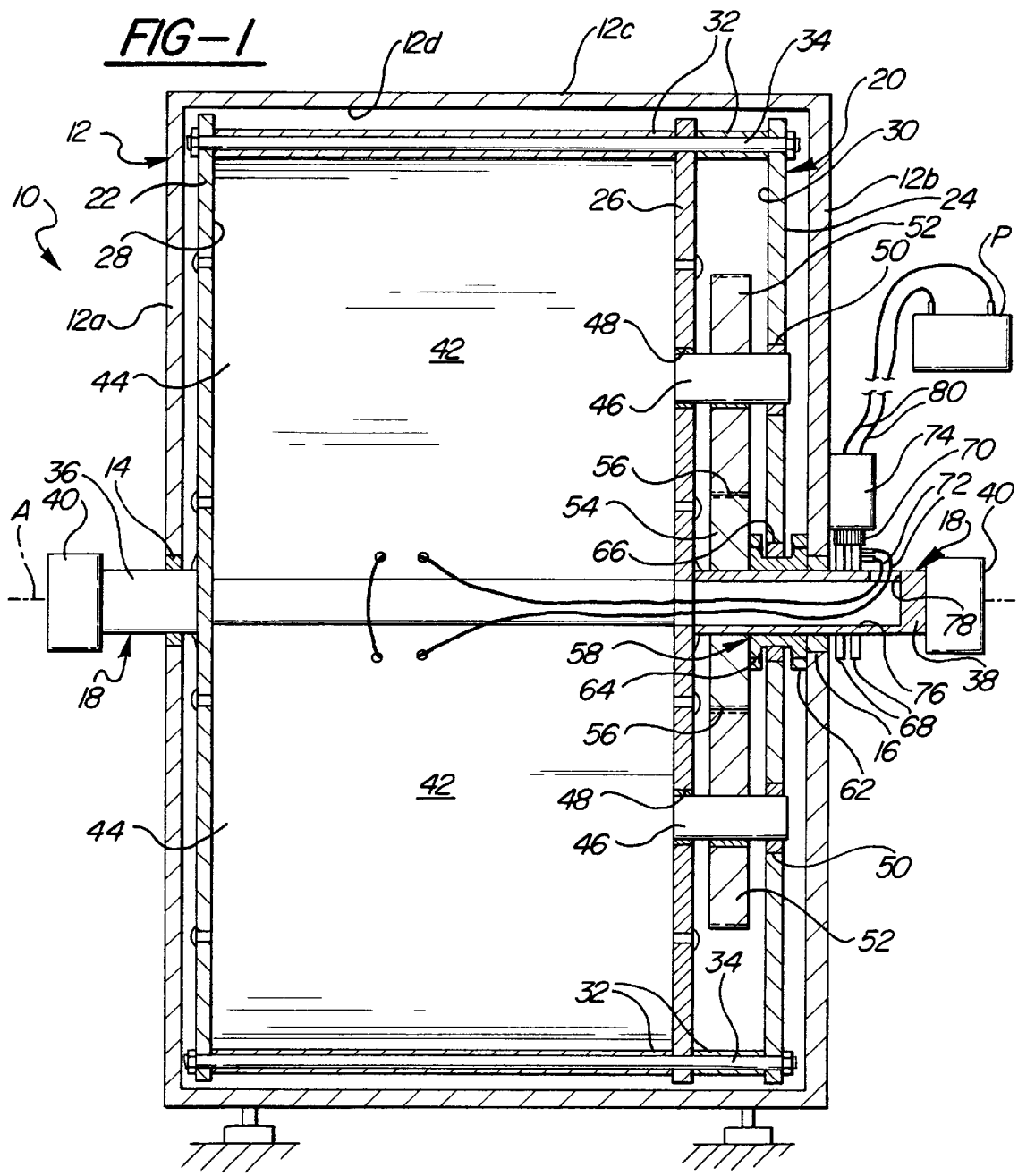
FIG. 1 is a cross-sectional front elevation view of a drive gear assembly constructed according to one embodiment of the invention.

A gear-reducing, torque-multiplying gear drive assembly constructed in accordance with a first embodiment of the invention is indicated generally at 10 in FIG. 1 and comprises a stationary housing or case 12 having opposed end walls 12a and 12b and a surrounding enclosure wall 12c enclosing a space 12d with the case 12. The end walls 12a, 12b of the case 12 have openings in which suitable journal bearings 14, 16 are provided supporting an output shaft 18 for rotation about a longitudinal axis A thereof relative to the case 12.

A rotary cage or carrier 20 is accommodated within the case 12 and fixed to the output shaft 18 for rotation therewith about the axis A. The carrier 20 comprises an open frame structure having spaced first and second end walls or plates 22, 24 and an intermediate wall or plate 26 arranged between the end plates and spaced from each to define first and second chambers 28, 30 of the carrier 20. The plates are connected to one another to provide a rigid frame structure by means such as spacers 32 and tie rods 34 provided a circumferentially spaced locations adjacent the perimeter of the plates.

As shown best in FIG. 1, the output shaft 18 is preferably divided into two sections or stub shafts 36, 38 the first of which is fixed such as by welding or other suitable fastening means to the first end plate and the second 38 of which is fixed to the second end plate 24 and preferably also to the intermediate plate 26 also by weldments or the like. The shafts 36, 38 are journaled by the bearings 14, 16, respectively and define dual power outlet spindles of the assembly 10. The shafts 36, 38 may be splined, fitted with output gears, or any of a number of suitable couplings, schematically shown at 40 in FIG. 1, of the type commonly used to connect an output spindle to a member to be driven (not shown).

At least one and preferably a pair of electric motors 42 are mounted on the carrier 20 for rotation therewith about the axis A. The motors 42 may be 12 volt ½0th horsepower permanent magnet motors wired preferably in series to provide a combined ¹⁄₁₀th horsepower input. Each motor 42 has a cylindrical housing or body 44 accommodated within the first chamber 28 of the carrier that is fixed at least to the intermediate plate 26 and preferably also to the first end plate 22 as shown in FIG. 1. To reduce the overall size of the assembly 10, the bodies 44 of the motors 42 are mounted in close proximity to one another, which may necessitate the need for the split output shaft 18. It will be appreciated, and the invention contemplates, that the motor bodies 44 could be spaced sufficiently to accommodate a one piece output shaft 18 in lieu of the two piece construction shown in the drawings.

Each motor has a drive shaft 46 projecting from the body 44 through an opening 48 in the intermediate plate 48 into the second chamber 30, where they are journaled at their free ends by bearings 50 provided in the second end plate 24, supporting the shafts 46 and parallel, spaced relation to the output shaft 18.

Fixed to each drive shaft 46 is a planet gear 52 in the preferred form of a spur gear. The gears 52 are of the same size and are accommodated in the second chamber 30 of the carrier 20.

A stationary sun gear 54 is provided coaxially about the output shaft 18 and has teeth enmeshed with the teeth of the planet gears 52 as shown at 56. The sun gear 52 is fixed against rotation to the case 12 by bushing 58. The bushing 58 is arranged about the shaft 18 and extends through an opening in the second end plate 24. End flanges 62, 64 of the busing 58 are fixed to the case 62 and gear 64, respectively. The internal bore of the bushing 58 through which the shaft 18 extends may be slightly larger in diameter than the output shaft 18 or else provided with a low friction intersurface, liner, or bearing so that the shaft 18 is free to rotate with little or no friction within the bushing 58. A bearing 66 may be provided in the opening of the second plate 24 about the bushing 58 to support the second end plate 22 during rotation.

Power to the motors 42 is provided through slip rings 68 and brush sets 70. The rings 68 are fixed to the output shaft 18 and are coupled by lead wires 72 to the motors 42. As shown best in FIG. 1, the stub shaft 38 is preferably hollow for part of its length and is open at its inner end to accept the lead wires 72 from the motors 42 into the bore 76 of the shaft 38. An oblong side opening 78 is provided in the shaft 38 out of which the wires 72 extend and are connected to the slip rings 68.

The brush sets 70 are stationary and may be conveniently supported in wiping contact with the slip rings 68 by a brush holder 74 fixed to the case 12. Power leads 80 are coupled to the brush sets 70 and extend therefrom to a power supply P.

Power supplied to the motors 42 causes the shafts 46 and the planet gears 52 mounted thereon to rotate. Such rotation on the planet gears 52 causes the carrier 20 to rotate about the axis A through the interaction of the planet gears 52 with the fixed sun gear 54. The stub shafts 36, 38, being fixed to the carrier 20, rotate with the carrier about the axis A and may be employed as single or dual output drives of the assembly 10 for operating the device to be driven (not shown).

The preferred gear arrangement is one where the planet gears 52 and the sun gear 54 are of the same size, for example all two inch spur gears. Such a gear arrangement and size generates a two-to-one gear ratio between the drive shaft 46 and the output shaft 18, while believed to generate a one-to-four torque ratio.

Figure 2:
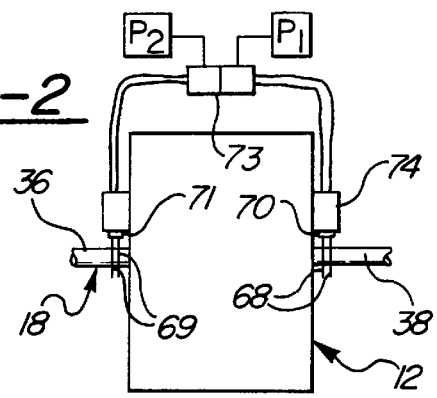
FIG. 2 is a schematic view of an alternative embodiment of the invention.

A variation of the FIG. 1 embodiment is shown schematically in FIG. 2, wherein like features are represented by like reference numerals. The gear drive assembly of FIG. 2 is identical to that of FIG. 1 except that it includes an additional slip ring 69 and brush set 71 on the other stub shaft 36 that is preferably identical to the rings 68 and brush set 70 described above. The two ring and brush sets may be coupled in parallel, with one of the sets serving as an auxiliary or the two operating in concert. The ring and brush sets may be coupled to a double pole/double throw switch 73 that in turn is wired to two power supplies $P_1$ and $P_2$ of different voltages (e.g., 6 and 12 volts, respectively) associated with each of the ring and brush sets to permit the voltage supplied to one or both ring and brush sets to be altered if desired.

FIG. 3 shows another embodiment of the invention, wherein like reference numerals are used to indicate like features to the embodiment of FIG. 1, but are offset by 100.

The apparatus 110 is similar in that it includes a stationary housing 112 journaling an output shaft 118 and within which a rotary carrier 120 is accommodated and fixed to the shaft 118 for rotation therewith relative to the case 112. Similar, smaller bodied motors 142 are mounted on the carrier 120 in the same manner, but are spaced sufficiently to accommodate the output shaft 118 therebetween. As illustrated, the shaft 118 is journaled by a bearing 114 in the case 112 and extends therefrom through openings in the first and intermediate plates 22, 26 and is fixed thereto by set screws 84 or the like.

In this embodiment, the busing 58 is eliminated and the sun gear 154 is fixed to the case 112 instead by means of stub shank 86. The shank 86 is welded or otherwise fixed to the case 112 at one end and fixed to the sun gear 54 at the opposite end by means such as a set screw 88. The shank 86 extends through an opening in the second end plate 124 in which a bearing 90 is provided for journaling the carrier 120 on the stub shank 86.

The output shaft 118 is similarly hollowed along part of its length to provide an internal bore or passage 96. Openings 92, 94 are provided in the output shaft 118 and communicate with the passage 96 of the shaft 118 for the routing of the wires 72.

The operation of the apparatus 110 is identical to that of the first embodiment except that there is only one rather than dual output drives. Another notable difference is that the spacers 32 and tie rods 34 of the first embodiment have been replaced by cross plates 98 that are fixed such as by welding to the plates 122, 124 and 126.

The disclosed embodiments are representative of presently preferred forms of the invention, but are intended to be illustrative rather than definitive thereof. The invention is defined in the claims.

I claim:

1. A rotary gear drive assembly comprising:
   a stationary outer case;
   a rotary carrier accommodated within said case;
   an output shaft fixed to said carrier and journaled by said case;
   a stationary sun gear fixed against rotation to said case;
   a bushing disposed about said output shaft and coupling said sun gear fixedly to said case; and
   at least one electric motor mounted on said carrier having a drive shaft supported in parallel, spaced relation to said output shaft and a planet gear mounted on said drive shaft and drivingly coupled to said fixed sun gear, wherein rotation of said drive shaft effects driven rotation of said carrier and said output shaft.

2. The assembly of claim 1 including a pair of said electric motors fixed to said carrier each having an associated said drive shaft and said planet gear drivingly coupled to said fixed sun gear.

3. The assembly of claim 2 wherein said carrier includes a pair of spaced plates.

4. The assembly of claim 2 wherein said carrier includes a pair of end plates and an intermediate plate disposed between said end plates in laterally spaced relation thereto defining a first and second chamber of said carrier.

5. The assembly of claim 4 wherein said motors include motor bodies accommodated within said first chamber and fixed at one end thereof to one of said end plates and fixed at an opposite end thereof to said intermediate plate.

6. The assembly of claim 5 wherein said shafts of said motors extend beyond said intermediate plate and are journaled at free ends thereof by the other of said end plates.

7. The assembly of claim 6 wherein said planet gears and said sun gear are accommodated within said second chamber.

8. The assembly of claim 7 wherein said planet gears have teeth enmeshed with teeth of said fixed sun gear.

9. The assembly of claim 8 wherein said planet gears and said fixed sun gear are of the same size.

10. The assembly of claim 2 wherein said motors are wired in series.

11. The assembly of claim 1 wherein said carrier is journaled about said bushing.

12. The assembly of claim 1 wherein said carrier includes a pair of end plates and said output shaft comprises a pair of stub shafts one of which is fixed to one of said end plates and the other of which is fixed to the other of said end plates in coaxial alignment with said one stub shaft.

13. The assembly of claim 12 wherein said stub shafts are journaled by said case and define a dual outputs of said assembly.

14. The assembly of claim 1 wherein said output shaft extends into said carrier in a space between said motors.

15. The assembly of claim 14 including a stationary stub shank fixed to said case and said sun gear and journaling said carrier.

16. The assembly of claim 1 including at least one slip ring and brush set associated with said output shaft.

17. The assembly of claim 16 where there are two of said slip ring and brush sets associated with said output shaft.

18. A rotary gear drive assembly comprising:

a stationary case;

a rotary carrier accommodated within said case having a pair of end walls and an intermediate wall spaced between said end walls and defining first and second chambers of said carrier;

an output shaft fixed to said carrier and journaled by said case for rotation of said carrier and said shaft about a longitudinal axis of said shaft, said output shaft including a first stub shaft section fixed to one of said end plates and journaled by said case, and a second stub shaft fixed to the other of said end plates and said intermediate plate and journaled by said case, said stub shafts extending externally of said case to define dual outputs of said assembly;

a toothed sun gear arranged within said second chamber and fixed against rotation to said case; and a pair of electric motors mounted on said carrier each having a motor body accommodated in said first chamber and fixed to said first end plate and said intermediate plate, a drive shaft extending beyond said body and journaled at a free end thereof by said other end plate in spaced relation to said output shaft, and a toothed planet gear fixed to said drive shaft within said second chamber and enmeshed with said fixed sun gear so as to impart rotation to said carrier and said stub shafts in response to driven rotation of said planet gears by operation of said motors.

19. A rotary gear drive assembly comprising:

a stationary case;

a rotary carrier accommodated within said case having a pair of end walls and an intermediate wall spaced between said end walls and defining first and second chambers of said carrier;

an output shaft journaled by said case and extending into said first chamber, said shaft being fixed to said intermediate wall and the end wall associated with said first chamber for rotation of said carrier and said shaft about a longitudinal axis of said shaft;

a stationary stub shank fixed to said case and extending into said second chamber of said carrier, said carrier being journaled on said stub shank;

a toothed sun gear accommodated within said second chamber and fixed against rotation on said stationary stub shank;

a pair of electric motors mounted on said carrier; each motor having a motor body accommodated within said first chamber, a drive shaft extending beyond said body and into said second chamber, and a toothed planet gear fixed to said drive shaft within said second chamber and enmeshed with said fixed sun gear so as to impart rotation to said carrier and said output shaft in response to driven rotation of said planet gears by said motors.

* * * * *